May 17, 1927.
F. L. WEAVER ET AL
ELECTRICAL CONNECTER
Filed May 4, 1925
1,629,189
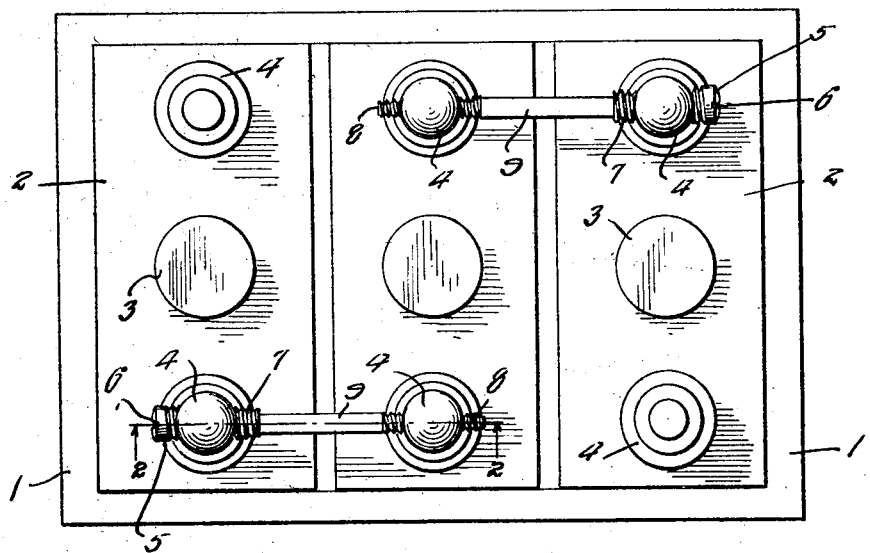
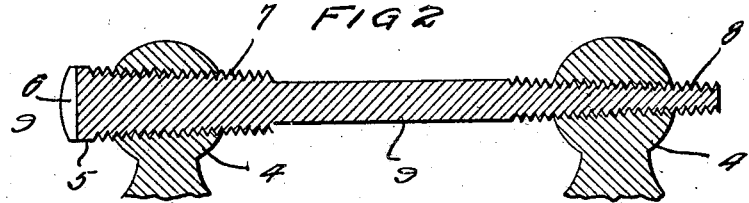
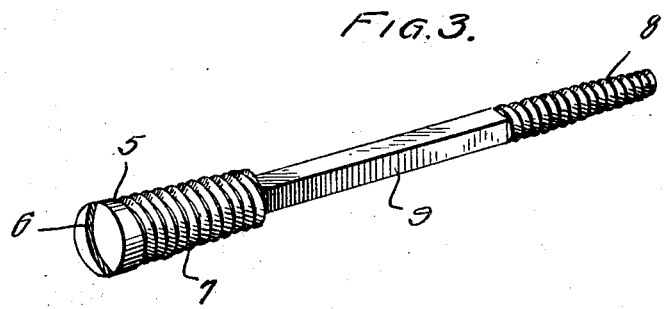
Inventor
Frank L. Weaver
and Michael F Campion
By Semmes & Semmes
Attorney Patented May 17, 1927.

1,629,189

UNITED STATES PATENT OFFICE.

FRANK L. WEAVER AND MICHAEL F. CAMPION, OF NORWICH, CONNECTICUT.

ELECTRICAL CONNECTER.

Application filed May 4, 1925. Serial No. 27,813.

Our invention relates to electrical connecters, and more particularly to a connecter to be used with electric storage batteries.

An object of our invention is to provide a tapered connecter to connect the plate terminals of storage batteries.

Another object of our invention is to provide a tapered connecter with means to insure an electrical connection between the plate terminals of storage batteries.

Yet another object of our invention is to provide a connecter with means to adjust the connecter contact between the plate terminals of storage batteries.

A still further object of our invention is to provide a connecter for electric storage batteries which is strong and sturdy in construction, easily attached to the terminals of such batteries, and when once attached will permanently maintain a secure electrical connection between the plate groups.

With these and other objects in view which may be incident to our improvements, the invention consists in the parts and combinations to be hereinafter set forth and claimed, with the understanding that the several necessary elements comprising our invention, may be varied in construction, proportions and arrangements, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

In the drawings:

Figure 1 is a top plan view of a storage battery illustrating our connecter as applied;

Fig. 2 is a sectional view along line 2—2 of Fig. 1, looking in the direction of the arrows;

Fig. 3 is a perspective view of our terminal connecter.

Referring to the drawings, and more particularly to Fig. 1, we have shown a storage battery comprising a container 1 in which is placed the usual plates and electrolyte of a storage battery. The container is provided with a suitable cover of inclosing material 2 having means 3 to introduce electrolyte into cells of the battery. The terminals 4 of the plate groups are connected by means of a terminal connecter which is provided with a head portion 5 having a slot 6 adapted to receive a screw-driver whereby the connecter is turned into the terminals.

A threaded portion 7 of the head 5 engages with a tapering threaded aperture in a terminal of a plate group, and a threaded portion 8 engages with an adjacent tapering threaded aperture in a terminal of a plate group. Between the threaded portion is an intermediate portion 9 rectangular in cross section, which provides an additional means to turn the threaded connecter into the terminals. In this connection it should be noted that the connecter is tapered and that the threaded portions 7 and 8 have the same pitch. In some instances, where the battery posts are of soft metal, the screw-threads may be formed by screwing the connecter into unthreaded apertures formed in the battery posts. Whether or not the screw threads in the battery posts are previously formed is a matter of choice under existing known conditions of operation.

Our connecter is adapted to be used as a terminal for new batteries as well as replacements in repair work. The connecter or strap will save time as it does not require burning on to a plate group terminal as do the connecters in present use. The connecter provides a sure connection, as it is screwed into the plate terminals, which is the best way of maintaining a contact between the terminals and insuring a tight connection.

The connecter also saves material and is a decided improvement in repair work as there is no cutting or rebuilding of parts. In repairing a battery, it is not necessary to take off the whole strap, the strap is simply sawed on each side of the terminal post and after the plates have been repaired, connection between the plate terminals is obtained by means of the connecter.

A hole is drilled through one of the terminals by means of a tapered bit or drill and the connecter is inserted in the hole and turned by means of a screw-driver and given an additional tightening by using a wrench on the rectangular intermediate portion.

Referring to Fig. 2, we have shown our connecter in position between two battery plate terminals. The threaded portion 7 and the threaded portion 8 pass through the terminals 4, insuring a strong mechanical and electrical connection between the terminals.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. In combination with an electrical storage battery including the battery plate groups and their terminals, a connecter for the terminals comprising a tapered member having threaded portions adapted to engage with the plate group terminals.

2. In combination with an electrical storage battery including the battery plate groups and their terminals, a connecter for the terminals comprising a tapered rod member having threaded portions adapted to engage the plate group terminals.

3. In combination with an electrical storage battery including the battery plate groups and their terminals, a connecter for the terminals comprising a tapered rod member threaded at both ends for a short distance of its length, said threaded portions being adapted to engage with the plate group terminals.

4. In combination with an electrical storage battery including the battery plate groups and their terminals, the terminals being tapped, a connecter for the terminals comprising a tapered rod member threaded at both ends for a short distance of its length and having an intermediate rectangular portion, the threaded ends being adapted to engage with the taps at the terminals.

5. In combination with an electrical storage battery including battery plate groups having tapped terminals, a connecter for the terminals comprising a tapered rod member having threaded end portions and an intermediate portion which is not threaded, said threaded portions being adapted to engage with the threaded taps in the terminals.

6. In combination with an electrical storage battery having terminals of its plate groups tapped, a connecter for the terminals comprising a tapered member, a slotted head upon the tapered member, threaded portions upon the tapered member adapted to engage the taps in the terminals and a rectangular portion upon the tapered member intermediate the threaded portions for manipulating the member.

In testimony whereof we affix our signatures.

FRANK L. WEAVER.
MICHAEL F. CAMPION.